United States Patent

[11] 3,591,211

| [72] | Inventor | Clarence B. Richey<br>Royal Oak, Mich. |
|---|---|---|
| [21] | Appl. No. | 853,859 |
| [22] | Filed | Aug. 28, 1969 |
| [45] | Patented | July 6, 1971 |
| [73] | Assignee | Massey-Ferguson Inc.<br>Detroit, Mich. |

[54] SUPPORT BAR CLAMP
5 Claims, 4 Drawing Figs.

[52] U.S. Cl. ................................................ 287/54,
248/229, 306/1.5
[51] Int. Cl. .................................................... F16b 7/00
[50] Field of Search .......................................... 248/221,
228, 229, 226; 306/1.5; 287/51, 54 B, 49

[56] References Cited
UNITED STATES PATENTS
2,584,614 2/1952 Rasmussen et al. ............ 306/1.5

FOREIGN PATENTS
968,226 11/1950 France .................. 287/54
1,418,470 10/1965 France .................. 287/51

Primary Examiner—Edward C. Allen
Assistant Examiner—J. Franklin Foss
Attorney—Gerhardt, Greenlee & Farris ABSTRACT: A square section support bar is provided with a clamp for clamping another bar to it in perpendicular relation. The clamp comprises a generally U-shaped strap embracing one-half the periphery of the support bar and having a pair of aligned slots in its legs for receiving the other bar. A pair of wedges are interposed between the bars and are apertured at an oblique angle to the other bar to receive bolts which interconnect with a threaded member between the bars. Tightening the bolts forces the bars apart. Since the force is applied at an angle to the shank, the lateral tension force is greater than the bolt tension force. This enables use of a smaller more compact clamp.

PATENTED JUL 6 1971 3,591,211

CLARENCE B. RICHEY
BY
Gerhardt, Greenlee & Farris
ATTORNEYS

PATENTED JUL 6 1971 3,591,211

INVENTOR.
CLARENCE B. RICHEY
BY
Gerhardt, Greenlee & Farris
ATTORNEYS.

SUPPORT BAR CLAMP

This invention relates generally to clamps and more particularly to an improved clamp for perpendicularly mounting two bars.

Many agricultural implements, such as scarifiers, cultivators, etc., comprise a plurality of individual ground-engaging tools each separately mounted by means of clamps at various spacings to a laterally extending tool support bar. It is conventional to provide some sort of strap which locates the tool shank which is usually a rectangular steel bar, perpendicularly of the tool support bar, with clamping means wedging between the shank and the bar to force the two outwardly tightly against the confines of the strap. These clamps are also used to mount a mast frame and other devices to the tool support bar. Many types of clamps have been devised to increase the effectiveness of the clamp and to reduce the cost of the clamp itself, many of which are used. In one type of clamp, the wedges normally are interconnected by a bolt which extends between the bar and the shank parallel to the shank.

It is an object of this invention to provide a tool support bar clamp of the aforementioned type which greatly increases the clamping tension force for any particular bolt size and permits a more compact clamp assembly.

In accordance with this invention a clamp is provided for rigidly securing a first bar shank to a second support bar and includes a generally U-shaped strap engaging the support bar at its crotch and having a pair of aligned apertures in its legs for receiving the shank to confine and locate the support bar and shank in perpendicular relation, a pair of spaced wedge blocks interposed between the shank and the support bar, and tightening means engaging the blocks at an oblique angle to the shank for drawing the blocks toward each other to wedge the shank and support bar apart against the strap.

These and further objects and features of this invention will become more readily apparent upon reference to the following detailed description of a preferred embodiment, as shown in the annexed drawings wherein.

Figure 1:
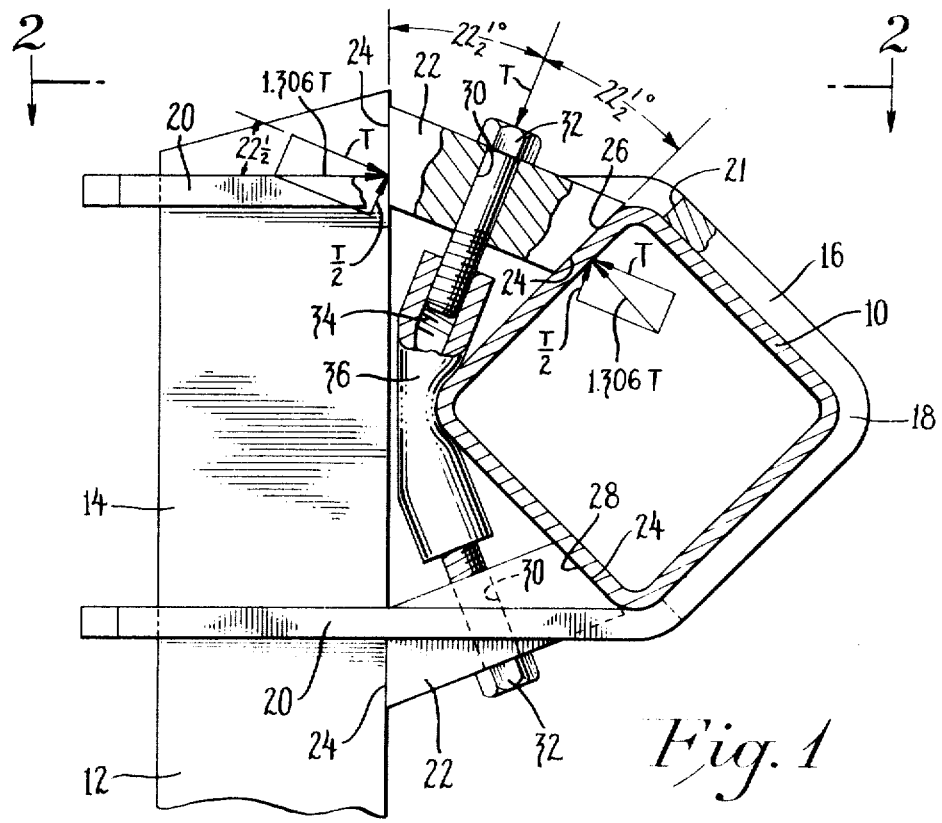
FIG. 1 is a partially broken-away side elevation of a support bar clamp according to this invention.
Figure 2:
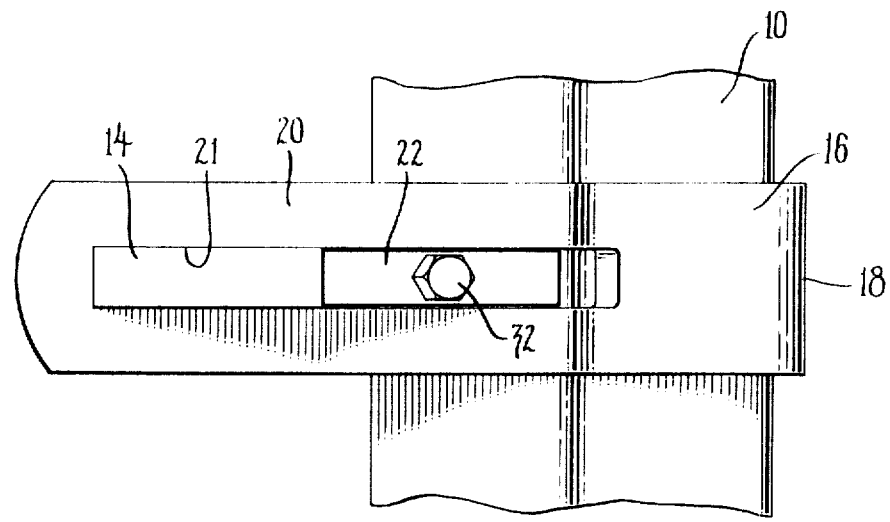
FIG. 2 is a plan view shown by lines 2-2 of FIG. 1.

Referring now to FIGS. 1 and 2 of the drawings, a conventional implement tool support bar 10 is a square section hollow tube and extends conventionally transversely of a tractor (not shown) which is adapted to pull the frame. A plurality of tools 12 (only one of which is shown) each includes a vertically extending rectangular bar section shank portion 14 which is to be mounted perpendicularly to the tool support bar 10 so that the working portion of the tool (not shown) is engageable with the ground. A clamp for rigidly attaching that shank 14 to the tool support bar 10 comprises a generally U-shaped strap 16 having a crotch portion 18 and a pair of legs 20. The legs 20 include aligned rectangular elongated slots 21 through which the tool shank 14 is inserted as illustrated.

A pair of wedge blocks 22 having sloping faces 24 are interposed between the shank 14 and the faces 26 and 28 of the tool support bar 10. Each of the wedge blocks 22 includes a central aperture 30 which is positioned at a 22½° angle to the tool shank 14. A bolt 32 extends through each of the blocks 22 at the 22½° angle and engages the threaded ends 34 of a bent and tapped tube 36.

To secure the tool shank 14 to the tool support bar 10, the bolts 32 are tightened to draw the blocks 22 toward each other, thus forcing the shank 14 and support bar 10 apart, with the crotch 18 of the strap 16 and the outer ends of slots 22 limiting their outward movement.

Figure 3:
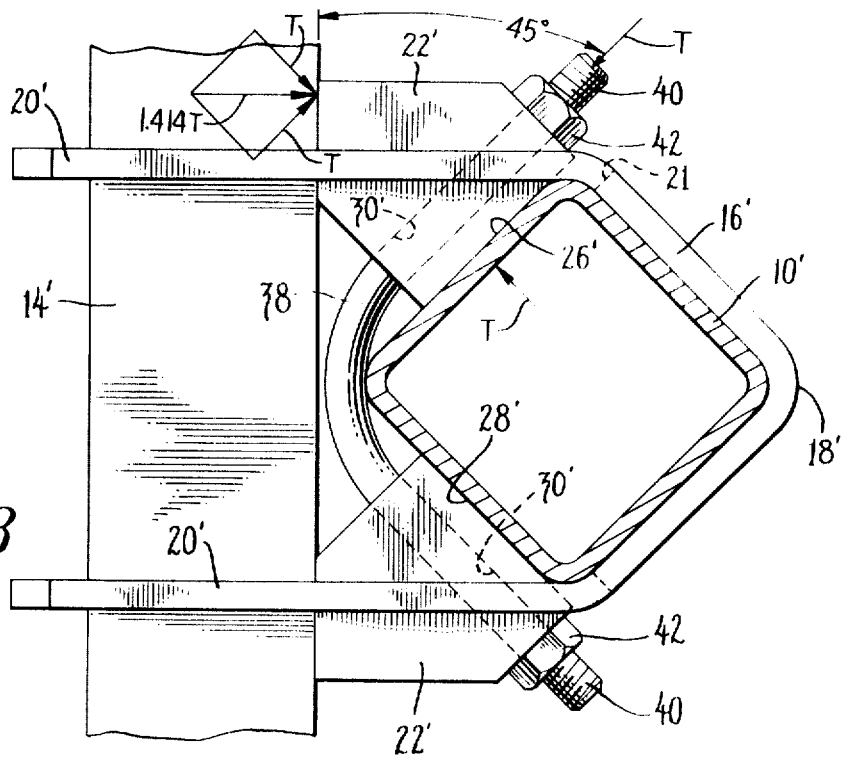
FIG. 3 is a view similar to FIG. 1 showing an alternative embodiment.

FIG. 3 shows an alternative embodiment in which similar parts are indicated by primed numerals. In this embodiment the wedge blocks 22' are provided with holes 30' which extend therethrough at an angle of 45° to the shank 14'. In this embodiment, a rod 38 is interposed between the shank 14' and the support bar 10' and is bent at a 90° angle to extend its threaded ends 40 through the slots 30' where they are threadedly engaged by nuts 42. Clamping is accomplished by tightening the nuts 42 which forces the shank 14' and the support bar 10' against the confines of strap 16'.

Figure 4:
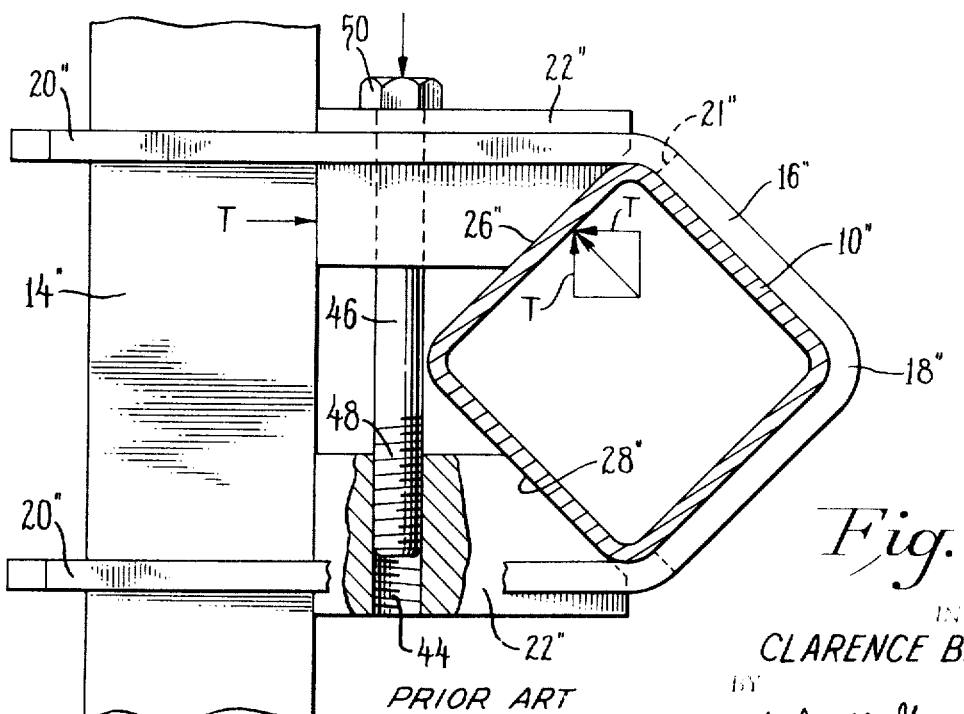
FIG. 4 is a view similar to FIG. 1 showing the prior art.

FIG. 4 shows a prior art embodiment where elements similar to those already described are indicated by double-primed numerals. In this embodiment the upper wedge block 22'' is provided with an aperture which extends parallel to the shank 14''. The bottom wedge block 22'' is provided with a threaded aperture 44 which is engaged by the threaded end 48 of a tensioning bolt 46 which has a head 50 engaging the upper surface of the upper wedge block 22''.

When the bolt 46 is tightened with a tension T the force diagram shown in FIG. 4 indicates that a resultant side tension force T wedges shank 14'' and support bar 10'' apart.

In contrast the FIG. 1 preferred embodiment obtains a greater side-tensioning force in a more compact arrangement with the same bolt-tensioning force T. As illustrated, the bolt-tensioning force T produces a resultant side-tensioning force 1.306 T which is derived by the following equation:

$$F = \frac{T_0}{\sin \alpha},$$

where

F = resultant side tensioning force
$T_0$ = component of bolt tensioning force acting on tool shank
$\alpha$ = angle of bolt tension to tool shank.

Thus, $$F = \frac{\frac{T}{2}}{\sin 22\frac{1}{2}°} = 1.306\ T.$$

Since the bolts extend at an angle of 22½° the shank 14, the wedge blocks 22 need be only wide enough to permit sufficient room between the inner end of support bar 10 and shank 14 to allow the tube 36 to be inserted. This compact arrangement may be contrasted to the prior art embodiment shown in FIG. 4 in which the bolt 46 extends parallel to the shank 14. Thus a much greater spacing between the inner end of support bar 10'' and the shank 14'' must be provided to enable a wrench to engage the head of bolt 46.

The other embodiment of this invention shown in FIG. 3 produces an even greater side tension for the same bolt tension T. As shown in the diagram of FIG. 3, the 45° angle with a bolt tension T produces a side tension of 1.414 T as derived by the above equation:

$$F = \frac{T}{\sin 45°} = 1.414\ T.$$

Also, in this embodiment, since the bolt 38 extends at a 45° angle to the shank 14', the spacing of the shank 14' and the inner end of the support bar 10' need be only sufficient to allow passage of the rod 36 therebetween.

It is readily apparent that angles of bolt tension other than the illustrated 22½° and 45° will produce other side-tensioning forces in accordance with the aforementioned equation.

While only a preferred embodiment is shown, it is obvious that the illustrated shank 14 could be a portion of a hitch frame or any other device conventionally mounted on a tool bar or any other bar of that type.

Thus this invention provides a clamp for clamping a tool shank or other bar section device to a tool support bar which is more compact than prior art clamps, and produces a greater side tension for the same bolt-tensioning force, thereby enabling the use of smaller bolts. Since the tool bar and the tool shank or other bar section device may be more closely engaged, a smaller strap may be used along with smaller wedge blocks, all of which produce a less expensive clamp. Since a large plurality of these clamps are normally utilized in any one implement, the savings in cost is significant.

I claim:

1. A clamp for rigidly securing a first bar shank to a second support bar of generally rectangular cross section comprising: a generally U-shaped strap engaging a first pair of adjacent sides of the support bar at its crotch and having a pair of aligned apertures in its legs for receiving the shank to confine and locate the support bar and shank in perpendicular relation with the second pair of adjacent sides of the support diverging from the adjacent side of the shank, a pair of spaced wedge blocks interposed between said shank side and each of said second pair of support bar sides, and tightening means engaging the blocks at an oblique angle to said shank side for drawing the blocks toward each other to wedge the shank and support bar apart and against the strap.

2. The clamp of claim 1, wherein: the oblique angle is at least 22½°.

3. The clamp of claim 1, wherein: the oblique angle is approximately 22½°.

4. The clamp of claim 1, wherein: the blocks are apertured and the tightening means include a rod located between the support bar and shank and extending through the apertures at the said angle to the shank, the rod having threaded ends, and a nut engaging each block and a rod end.

5. The clamp of claim 1, wherein: the blocks are apertured and the tightening means include a fastener located between the blocks and between the support bar and shank, the fastener having threaded end portions positioned at the said angle to the shank, and a bolt engaging each block and extending through the aperture into engagement with the fastener.